(Model.)
A. L. GORHAM.
ORNAMENTATION OF CERAMICS.
No. 276,389. Patented Apr. 24, 1883.
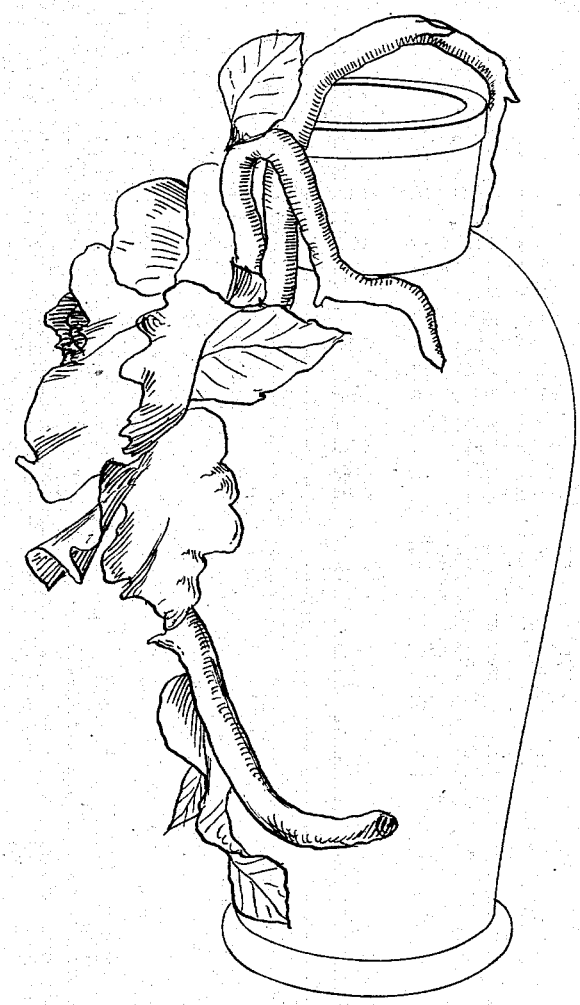
Witnesses:
Inventor

UNITED STATES PATENT OFFICE.

ANNIE L. GORHAM, OF BOSTON, MASSACHUSETTS.

ORNAMENTATION OF CERAMICS.

SPECIFICATION forming part of Letters Patent No. 276,389, dated April 24, 1883.

Application filed February 1, 1883. (Model.)

*To all whom it may concern:*

Be it known that I, ANNIE L. GORHAM, of Boston, in the county of Suffolk and State of Massachusetts, have invented certain Improvements in Ornamentation of Ceramics, of which the following is a specification.

This invention has for its object to provide an improved method of ornamenting the surfaces of ceramic and other articles which have been previously fired and made rigid with floral or other appropriate ornamentation in relief, and to produce at a small expense a close imitation of decorated ceramic ware, such as has been usually produced by modeling the relief ornamentation in the same ware as the article or vessel to be ornamented, applying the ornamentation to the vessel while both are in a soft condition, and making the union of the ornamentation and vessel permanent by baking or firing.

My invention consists in ornamenting a vessel or ceramic article already baked or made rigid by applying thereto ornamental forms modeled in a suitable compound which is plastic and adhesive when heated, and by cooling becomes rigid and strong, and therefore intimately united to the article to which it is applied.

In carrying out my invention I take any suitable compound which is plastic and adhesive when heated, and strong and rigid when cold. I have used with satisfactory results a compound composed of the following ingredients, in about the proportions named, viz: hard soap (Castile) or wax, four ounces; resin, four pounds; glue, seven pounds; glycerine, (with soap gives elasticity,) one ounce; whiting, enough to thicken.

I do not limit myself to this particular compound, however, for any other having like characteristics may be used without departing from the spirit of my invention.

The compound described is, when heated, of about the consistency of slightly-warmed wax, and can be readily modeled into any desired forms, such as of leaves and flowers. These molded forms I apply, while warm, plastic, and adhesive, to the surface of the article to be ornamented, such article being by preference of common unglazed pottery previously fired and made rigid. I then allow the ornamentation to cool and harden, and thus become firmly united to the article to which it is applied. The said article and applied ornamentation may then be painted and varnished. An ornamented vase may be thus produced, resembling closely one made by the usual method first described, both in appearance and strength.

For ornamental purposes an article made in accordance with my improved method is quite equal to one made as heretofore, but is much less expensive, because of the small cost of the materials employed, the simplicity of the process, and the fact that no skill is required excepting in modeling the ornamentation, which can be readily acquired by those ignorant of the methods used in the ceramic art.

The accompanying drawing represents a vase ornamented by my improved method.

I claim—

1. The improved method of ornamenting rigid ceramic articles, the same consisting in applying to such articles ornamental forms in a soft condition, composed of a compound which is soft and adhesive when heated, and hard and rigid when cooled, cooling said forms to harden and unite them to the baked ceramic surface, and suitably decorating said forms after they have hardened, as set forth.

2. As an article of manufacture, a ceramic article ornamented by forms molded in a compound which is soft and adhesive when heated, and hard and rigid when cooled, said forms being applied to the baked article in a plastic and adhesive condition, and united to the article and made rigid by cooling, as set forth.

In testimony whereof I have signed my name to this specification, in the presence of two subscribing witnesses, this 29th day of January, 1883.

ANNIE L. GORHAM.

Witnesses:
C. F. BROWN,
A. L. WHITE.